(12) United States Patent
Hanks (10) Patent No.: US 9,113,211 B1
(45) Date of Patent: Aug. 18, 2015

(54) CONSOLIDATION OF TIME-COMPRESSIBLE TIME-OFFSET MEDIA STREAMS

(71) Applicant: William Turner Hanks, Carol Stream, IL (US)

(72) Inventor: William Turner Hanks, Carol Stream, IL (US)

(73) Assignee: ARRIS Technology, Inc., Suwanee, GA (US)

( * ) Notice: Subject to any disclaimer, the term of this patent is extended or adjusted under 35 U.S.C. 154(b) by 0 days.

(21) Appl. No.: 13/645,966

(22) Filed: Oct. 5, 2012

Related U.S. Application Data (60) Provisional application No. 61/543,649, filed on Oct. 5, 2011.

(51) Int. Cl.
*H04N 21/472* (2011.01)

(52) U.S. Cl.
CPC ............................. *H04N 21/47202* (2013.01)

(58) Field of Classification Search
CPC .................................................. H04N 21/47202
USPC ....................................... 725/105, 34, 120, 95
See application file for complete search history.

(56) References Cited

U.S. PATENT DOCUMENTS

2007/0250890 A1* 10/2007 Joshi et al. ..................... 725/120

* cited by examiner

*Primary Examiner* — Brian Yenke
*Assistant Examiner* — Sihar Karwan
(74) *Attorney, Agent, or Firm* — Troy A. Van Aacken (57) ABSTRACT

Various methods, systems, and apparatuses can be used to consolidate unicast video streams into multicast video streams. In some implementations, a skewing window associated with multiple unicast video streams for a video can be identified using a maximum skewing rate and a program duration, and a multicast stream for the video can be generated based on the skewing window. The unicast video streams can then be skewed and merged with the multicast stream.

15 Claims, 9 Drawing Sheets

CONSOLIDATION OF TIME-COMPRESSIBLE TIME-OFFSET MEDIA STREAMS

TECHNICAL FIELD

This disclosure relates to consolidation of media streams.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

In a successful on-demand subscriber-based media service, there are likely to be multiple subscribers that request the same piece of media content at slightly different times. To serve these subscribers, the distribution architecture might call for a media server to create a separate media stream for each of these subscribers and direct each stream at the particular target subscriber. Such an arrangement would be recognized as a unicast delivery system. Alternatively, subscribers might be made to wait until the last subscriber requested the media stream and then the media server might create a single media stream and address it to all of the subscribers that have requested it. Such an arrangement would be recognized as a multicast delivery system.

Each arrangement can have benefits and drawbacks. For example, the unicast arrangement can provide instant response to each subscriber. However, such instant response comes at the cost of the transmission of multiple copies (e.g., duplicated bandwidth) of the media stream. The multicast arrangement serves many subscribers with a single media stream to save bandwidth usage. However, savings in bandwidth usage comes at the cost of synchronizing all subscribers' requests. Thus, all but the last subscriber receive a delayed response to their media service request. Ideally, the system would provide instant response to each subscriber while minimizing bandwidth usage.

BRIEF DESCRIPTION OF DRAWINGS

Like reference numbers and designations in the various drawings indicate like elements.

DETAILED DESCRIPTION

Internet access networks are not scaled properly to handle widespread distribution of unicast video. Broadband internet providers are struggling to address the increased bandwidth burden that IP video imposes. Even with network upgrades, the demand for access bandwidth is likely to increase for the foreseeable future, thus prompting internet providers to seek higher distribution efficiency. The goal is to serve the subscriber base with a high quality service with as little bandwidth as possible.

Unicast video streams can present a problem if implemented widescale. In particular, sending the same content to multiple users can be an inefficient use of bandwidth. In some implementations of this disclosure, systems and methods can be used to skew the inefficient unicast video streams towards a multicast video stream. When the unicast video stream playout matches the multicast video stream playout, the unicast recipient can be switched over to the multicast playout, and the unicast stream can be terminated. This consolidation can result in a bandwidth savings when multiple unicast recipients are switched to a multicast stream.

Figure 1:
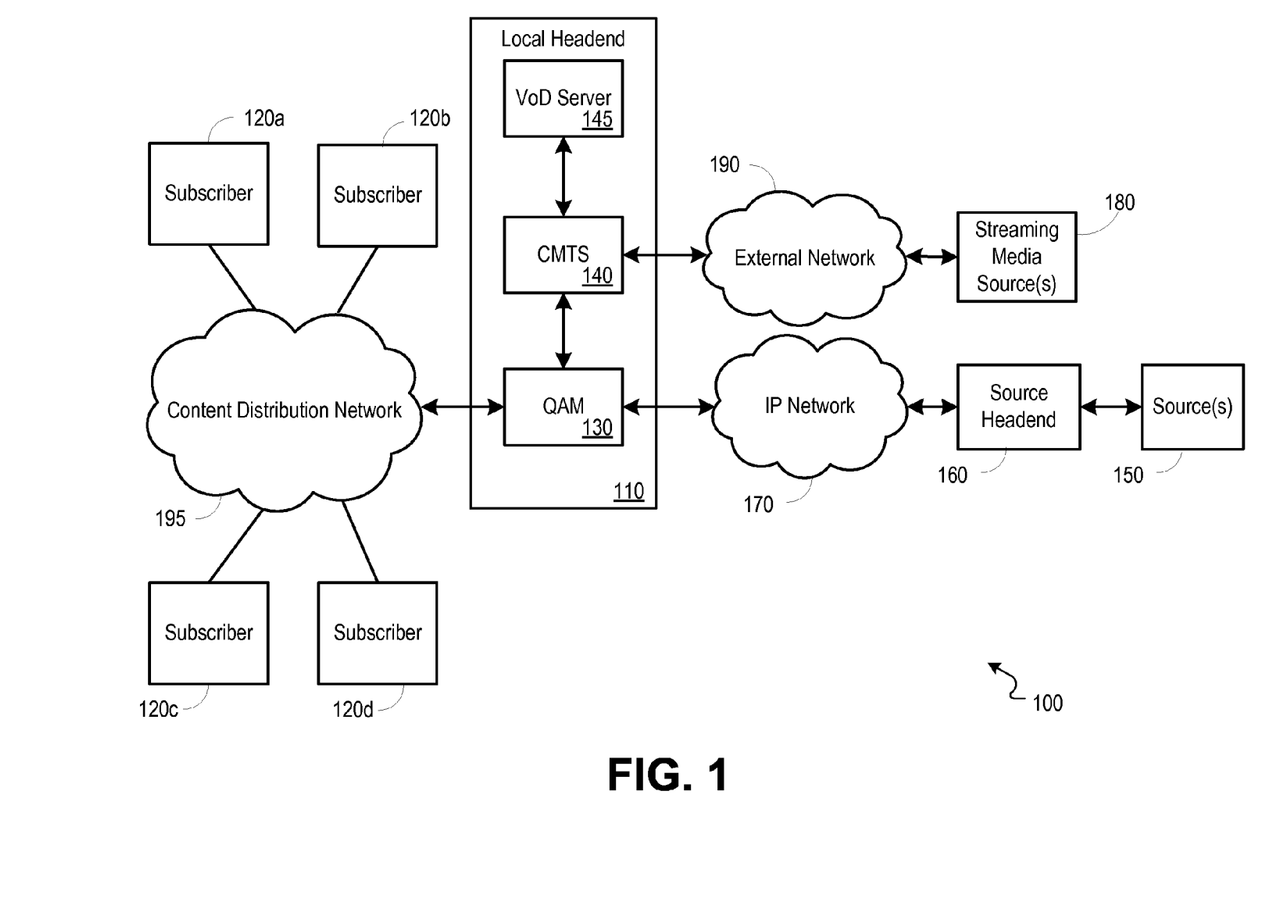
FIG. 1 is a block diagram illustrating an example network environment operable to consolidate unicast video streams into multicast video streams.

FIG. 1 is a block diagram illustrating an exemplary network environment 100 operable to consolidate media streams. In some implementations, a headend 110 can provide video, data and/or voice service(s) to one or more subscribers 120a-d (e.g., cable modem(s) and/or set-top box(es)). The headend 110 can include devices such as an edge quadrature amplitude modulation (EQAM) device 130 and a cable modem termination system (CMTS) 140. Video streams can be received from a video source (or sources) 150 through a source headend 160 via a network(s) 170 (e.g., including an IP network). In some implementations, these video streams can enter the system as raw moving picture experts group (MPEG) streams, or any other streaming video protocol supported by the headend 110 and/or EQAM device 130.

In other implementations, video streams can be received by the CMTS 140 from a video on demand (VOD) server 145. The VOD server can receive requests for video service via the CMTS, and provide the requested video to the CMTS. The CMTS can address the video to one or more subscribers 120a-d and forward the addressed video to the QAM for modulation onto a carrier signal.

Data services can be handled by the headend 110 through a CMTS 140. The CMTS 140 can receive data signals from subscribers 120a-d and server(s) 180 through an external network(s) 190 (e.g., including the Internet). The network(s) 190, for example, can operate using Internet protocol (IP), sending data packets to and receiving data packets from the headend 110. In some examples, the CMTS 140 can be paired with a SIP proxy server (not shown) operable to provide voice over internet protocol (VoIP) services with connectivity to the public switched telephone network (PSTN). In still further examples, one or more video sources 150 can provide streaming data through the network(s) 190 to the CMTS 140.

In some implementations, the CMTS 140 can forward received packets to the EQAM device 130 used to modulate the signal onto a carrier waveform. The carrier waveform can include both data and video streams, in both multicast and unicast (e.g., point-to-point) formats for transmission to a combiner, which can combine multiple signals onto a single transmission media (e.g., fiber, coax, etc.) to one or more service groups 120$a$-$d$ via a content distribution network 195 (e.g., a hybrid fiber-coax (HFC) network, digital subscriber line (DSL) network, fiber network, etc.). In other implementations, the CMTS 140 can modulate a baseband signal to a carrier wave and transmit the signal to a combiner for upconversion to a transmission frequency. In telecom environments, the CMTS and QAM can be replaced by a digital subscriber line (DSL) access multiplexer (DSLAM), which operates to modulate and multiplex video, data and/or telephony signals onto a transmission media (e.g., twisted pair). However, it should be understood that various other distribution mechanisms and protocol (e.g., PON, EPON, EPOC, RFOG, etc.) can be used and are intended to be included within the scope of the present disclosure.

After ranging and registering with the headend 110, subscriber devices 120$a$-$d$ can receive video and data (e.g., computer data and telephony data) from the headend 110 through the content distribution network 195. In some implementations, the subscriber devices 120$a$-$d$ can include one or more gateway devices operable to provide an integrated device for video, data and voice services for a subscriber household. The subscriber devices 120$a$-$d$ can also (or alternatively) include more traditional digital video recorders and/or set-top boxes. Still further, the subscriber devices 120$a$-$d$ can also (or alternatively) include various internet protocol (IP) devices or clients, such as computers, mobile devices, smartphones, tablet computers, IPTV devices, etc.

In some implementations, a video server (e.g., VoD server 145, Streaming media source(s) 180, or source(s) 150) operating to provide unicast video to a particular subscriber or group of subscribers can recognize instances where the same video content is being provided to multiple users in multiple unicast streams that differ from each other based on timing. Thus, for example, a unicast stream of a piece of content to a first user might be time-shifted from a different unicast stream of the piece of content to a second user (or more users). These unicast streams typically cannot be combined into a single multicast stream because the first user is consuming a specific segment of content at a different time than the second user would consume the same segment of content. In some implementations of this disclosure, systems and methods can operate to provide media stream manipulation techniques that can be used to relatively shift unicast media streams in play-out time to synchronize them as they are playing so that multiple unicast media streams might be replaced with a smaller number of multicast media streams.

Some types of media are meant to be consumed by an error-insensitive consumer. The human ear and/or human eye are/is incapable of detecting miniscule errors in an audio or video stream if the faults are spaced far enough apart. In fact, nearly all audio and video that is either stored or transmitted in the world today has errors introduced before transmission by one or more forms of digital compression that loses information about the original media source. These lost pieces of information go undetected by the human ear and/or eye because the human brain pieces the information together seamlessly. A small variation in play-out timing at a subscriber device 120$a$-$d$ might also go undetected by the human ear and/or eye. These factors are used in error recovery schemes where some transmission fault or network jitter might otherwise cause a noticeable stall in the media stream. Various media player algorithms employed by subscriber devices 120$a$-$d$ can adjust play-out timing or replicate or delete small slices of the media stream to make the stream quality better in the face of transmission errors.

In some implementations of this disclosure, a maximum shift rate R can be determined experimentally based on human perception factors to identify the most that a stream may be accelerated (via the use of accelerated presentation times, deleting frames, etc.) or decelerated (by decelerating presentation times, repeating video frames, etc.) without a perceived loss of quality. For example, a particular user can be provided a stream with a shift rate applied to the stream and the user can identify whether the applied shift rate was acceptable. Multiple shift rates can be supplied to the user in succession to identify the maximum shift rate R associated with a user or device 120$a$-$d$. In other implementations, a general shift rate can be determined for a population using similar techniques and averaging the various individual maximum shift rates to identify the general maximum shift rate R. Alternatively, the general maximum shift rate R can be set to the lowest acceptable shift rate determined within a population.

The experimentally determined shift rate in some implementations can be multiplied by two to represent that a stream may be either accelerated or decelerated and therefore streams on both side of the midpoint could be converged. The result shift rate range can then be multiplied by the duration of the media stream ("D") to determine the maximum window ("W") time over which streams may be synchronized. This window may then be fitted over the set of unicast media stream sessions to determine a set of sessions to combine into a single multicast session. If all of the unicast streams cannot be fit into the same window, then multiple sets of unicast sessions (e.g., two or more subsets of the entirety) might be combined into multiple multicast sessions.

Figure 2:
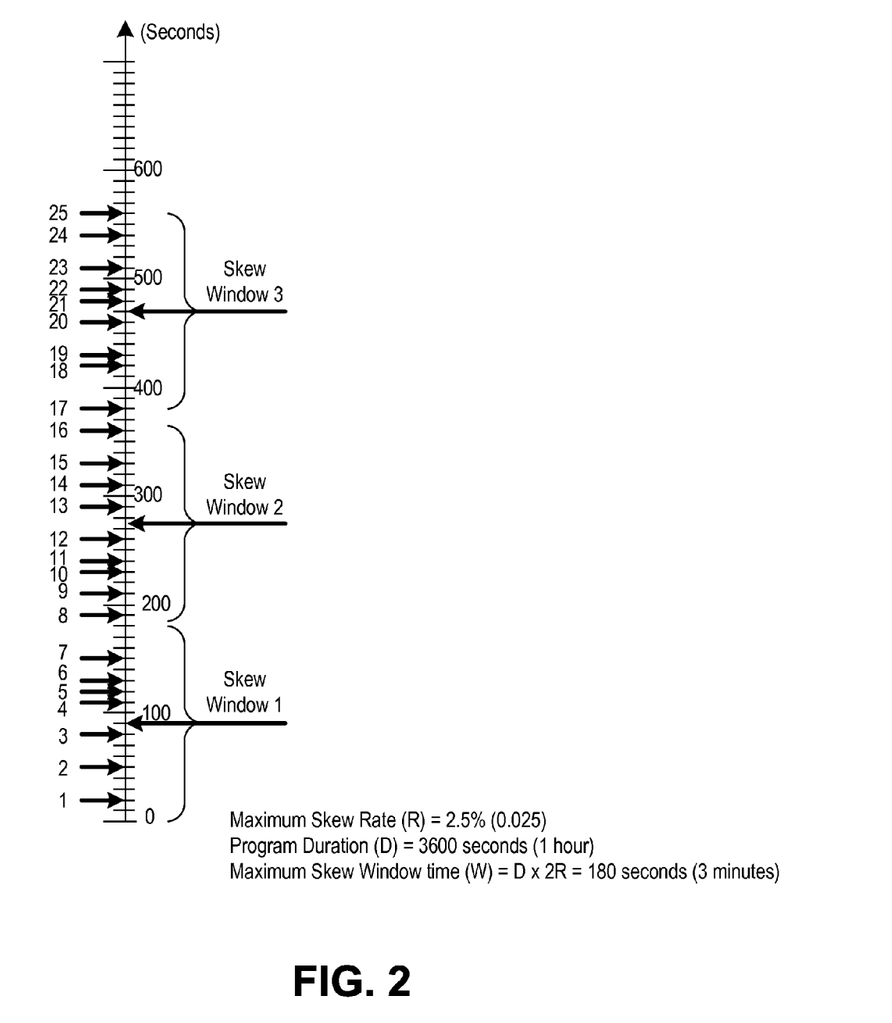
FIG. 2 is a timeline illustrating an example scenario for serving multiple unicast video streams which can be skewed and consolidated into multicast streams based on a skewing window.

As an example, consider FIG. 2. In this figure, twenty-five requests (represented by right facing arrows at their unicast stream start time) for the same media stream are made at different times. If a maximum skew rate of 2.5% were applied to a media stream of duration one hour (3600 seconds), then the skew window time would be 3 minutes. Given the example twenty-five unicast streams below, each can be shifted towards the middle of the skew window such that all 25 customers can be addressed by just three multicast streams (depicted by left pointing arrows, labeled "skew window n") before the media stream terminates.

Thus, a video server can adjust the playout rate of a unicast video stream to skew in one direction or the other toward one of the multicast streams. When a unicast video stream is skewed to match the playout of the multicast stream, the unicast stream can be discontinued in favor of the multicast stream. If this same process occurs for each of the 25 unicast streams in FIG. 2, the 25 unicast video streams can be combined into the three multicast streams as shown.

Figure 3:
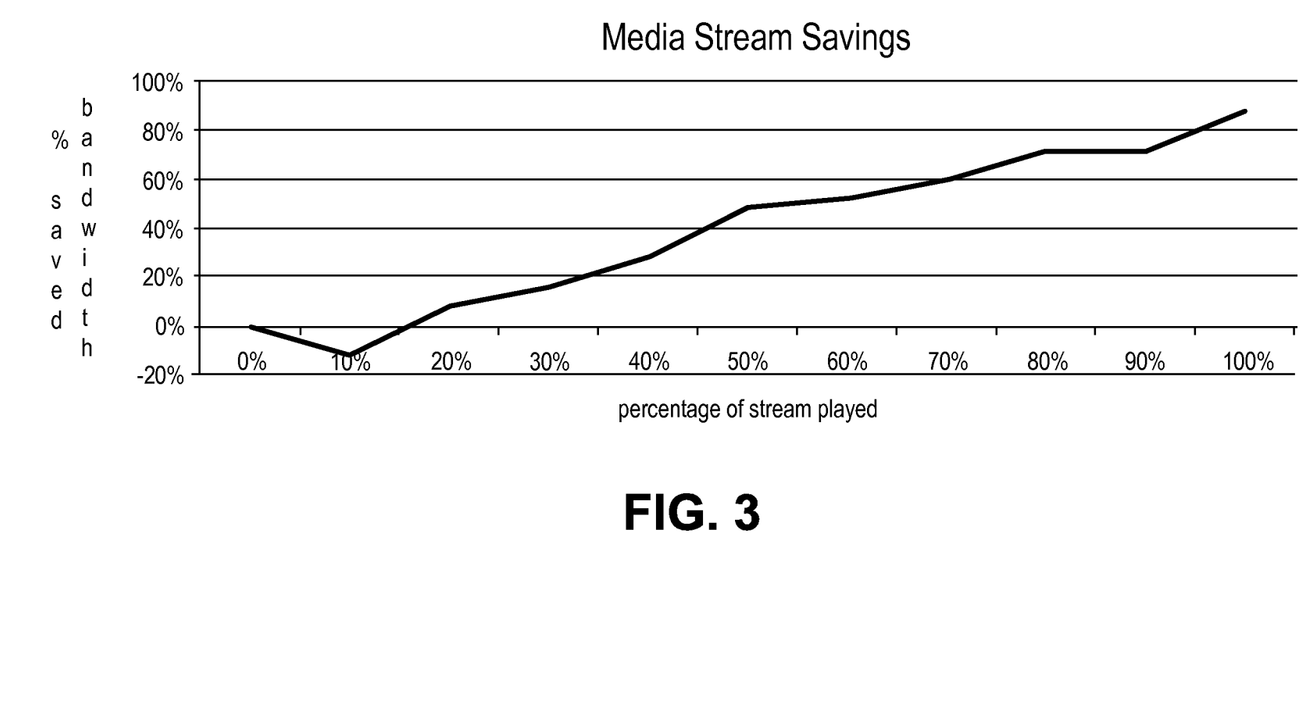
FIG. 3 is a graph illustrating example bandwidth savings achieved by skewing and consolidating the unicast video streams according to FIG. 2.

FIG. 3 is a chart representing the bandwidth savings achieved by combining the 25 unicast streams of FIG. 2 into three multicast streams. In an initial playout portion, the availability of the three additional streams caused by the multicast will mean that extra bandwidth is being used over the 25 streams being consumed. However, as each of the 25 unicast streams is progressively merged into one of the three multicast stream, three of the unicast streams have been collapsed into one of the three multicast streams at about 15% of the way through the playback, and bandwidth savings gradually increase, resulting in a savings of about 88% (22 of 25 streams eliminated).

It should be understood that the unicast streams at the edges of the skew window will not be converged until half of the media stream has been played. To resolve this issue, additional skew windows (e.g., smaller in magnitude than W) could be applied to the unicast stream to produce additional multicast streams. Then, if advantageous based on the implementation, these multicast streams can be skewed together as a next-order optimization.

Figure 4:
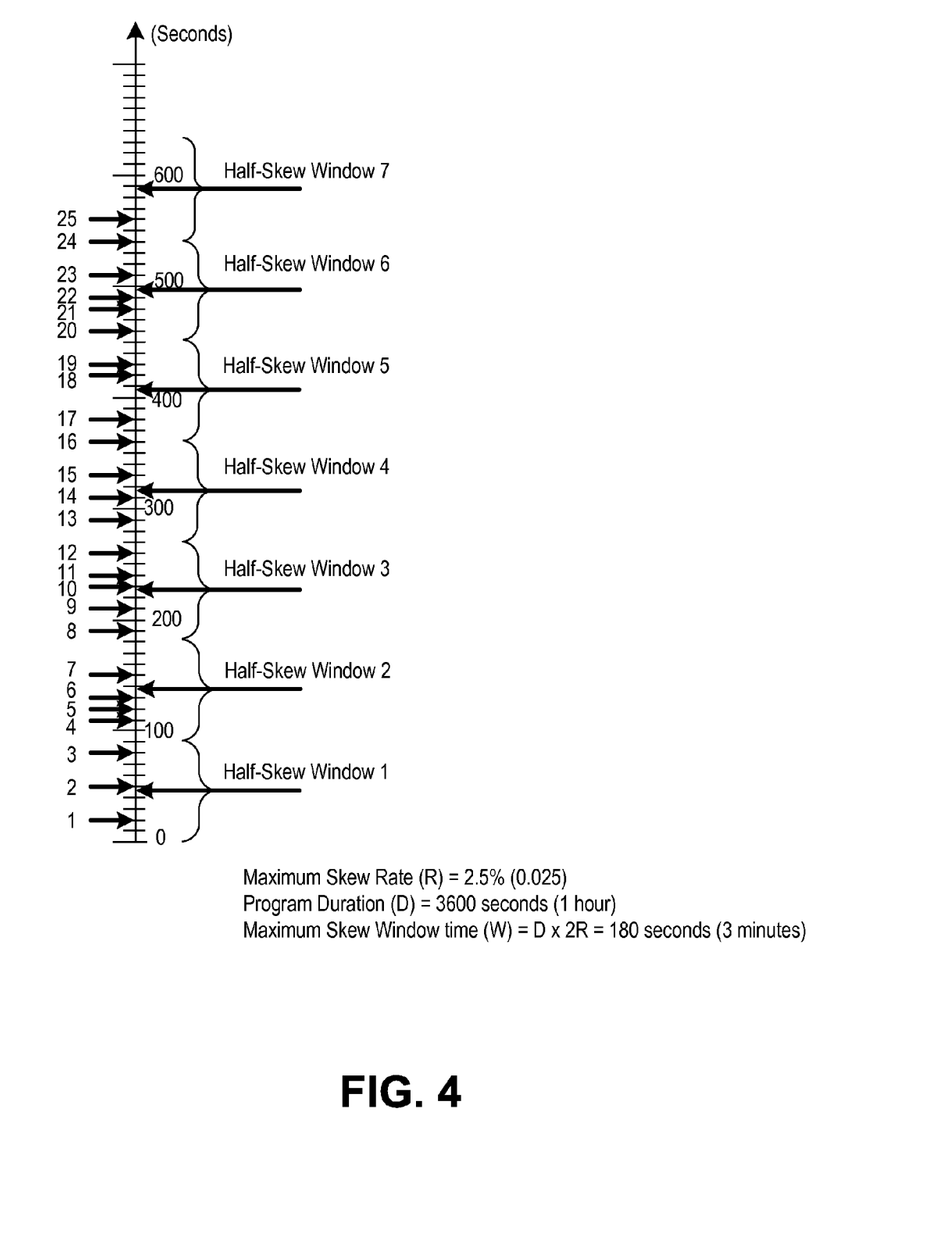
FIG. 4 is a timeline illustrating an example scenario for serving multiple unicast video streams which can be skewed and consolidated into half-skew multicast streams based on a half-skewing window.

Consider the example depicted in FIG. 4. Here again, the same twenty-five flows from the first example are used; however, approximately twice as many skew-windows are used. These skew windows converge to the multicast streams (left pointing arrows) in half the duration (½D) of the program stream.

Figure 5:
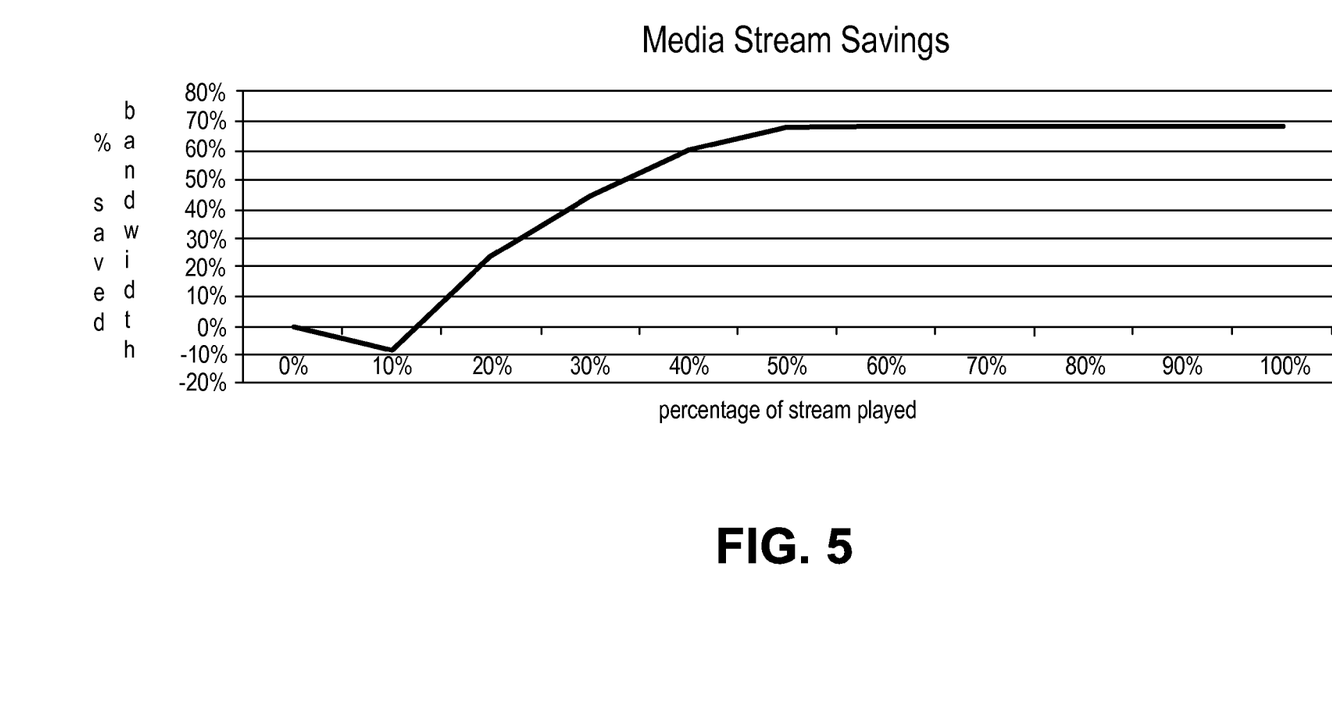
FIG. 5 is a graph illustrating example bandwidth savings achieved by skewing and consolidating the unicast video streams according to FIG. 4.

FIG. 5 is a chart representing the bandwidth savings achieved by combining the 25 unicast streams of FIG. 4 into six multicast streams each set to be about half a skewing window apart. In this chart, it should be understood that the initial six additional multicast streams result in a less efficient bandwidth usage until six of the unicast video streams have been merged into a respective one of the six multicast streams. In this example, it takes about 12 percent of the playback before bandwidth savings is achieved, but the maximum bandwidth savings are achieved roughly 50% through the playback of the video stream. Thus, while the bandwidth savings are less (19 of 25 streams eliminated versus the previous example where 22 of 25 streams are eliminated), the savings are seen much more quickly by the network because the unicast streams are able to be merged into the available multicast streams much more quickly because each unicast stream has less distance to be skewed to match the closest multicast stream.

Figure 6:
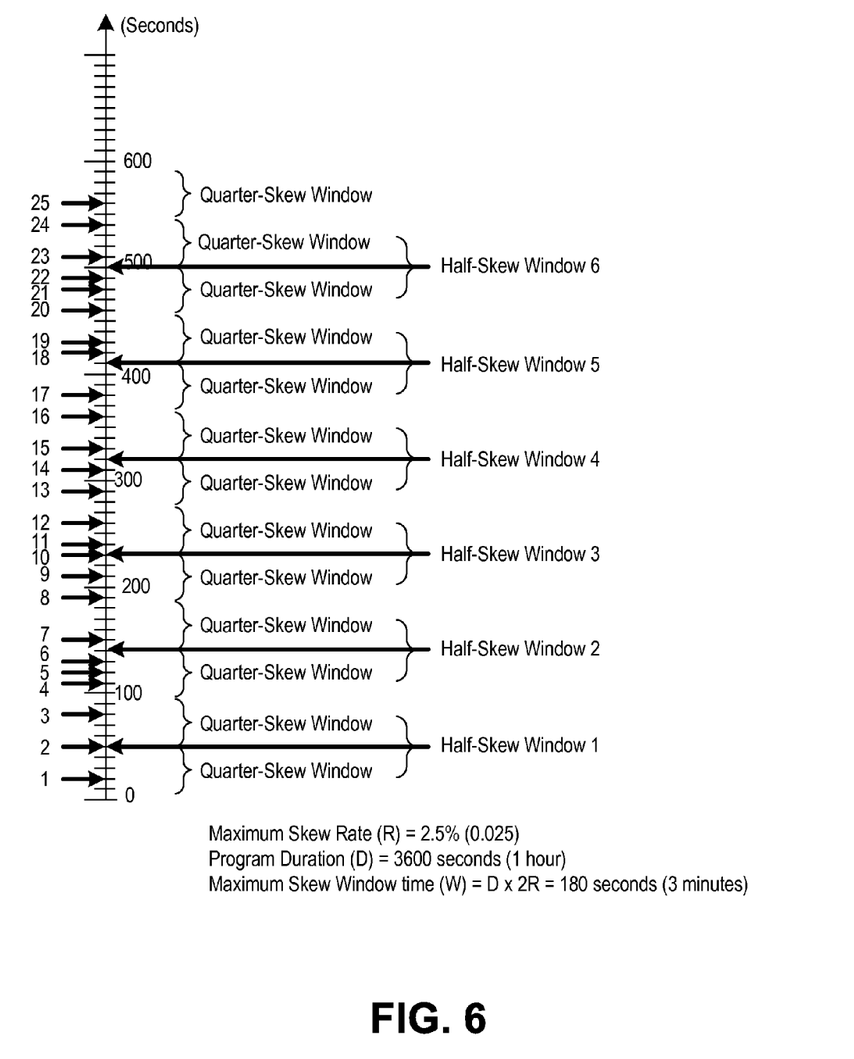
FIG. 6 is a timeline illustrating an example scenario for serving multiple unicast video streams which can be skewed and consolidated into quarter-skew multicast streams which can themselves be skewed and consolidated into half-skew multicast streams.

FIG. 6 takes the multicast concept an additional step further. In this example, the same starting position is depicted. However, in this example, a multi-phase approach is used such that that the quarter-skew-window streams (short left pointing arrows) will eventually be consolidated into half-skew-window flows (long left pointing arrows). However, because the multicast flows are spaced only a quarter-skew window apart, the second phase will converge in only an extra quarter of the duration of the stream. As an optimization, the unicast streams that are found between the quarter-skew and half-skew windows can be migrated towards the half-skew streams. This way, at a time of ¼D, the 25 unicast streams will have been reduced to 19 multicast streams and at a time of ½D, all of the quarter-skew multicast streams (except for the one at the top) will have been skewed into the six half-skew streams. Thus, it should be understood that the quarter-skew streams will be skewed towards a respective half-skew stream, as the various unicast streams are skewed towards the quarter-skew or half-skew stream, depending on which is closest.

Figure 7:
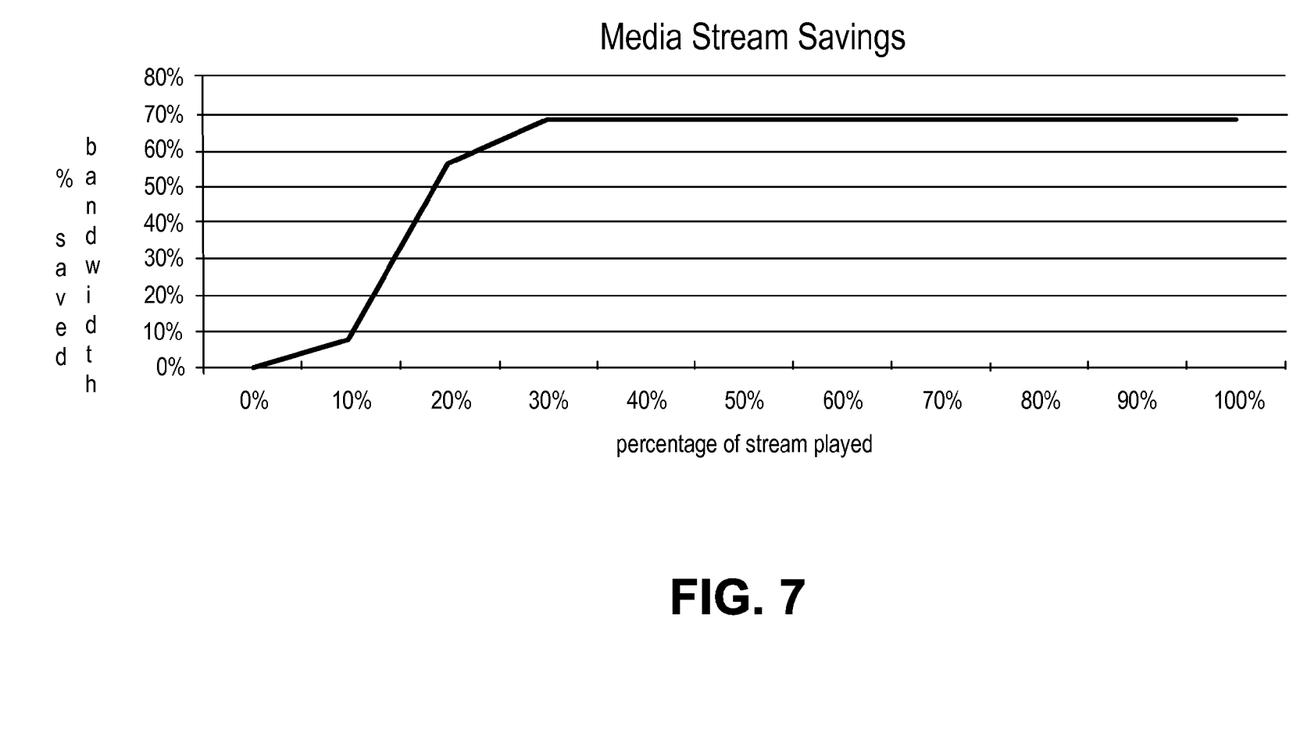
FIG. 7 is a graph illustrating example bandwidth savings achieved by skewing and consolidating the unicast video streams according to FIG. 6.

FIG. 7 is a chart representing the bandwidth savings achieved by combining the 25 unicast streams of FIG. 2 into three multicast streams. It should be understood that the 25 unicast streams eventually merge into six multicast streams, resulting in a significant savings of bandwidth over the 25 unicast streams. Moreover, because the windows are smaller, the unicast streams are more quickly merged into one of the quarter window streams, which then eventually merge into a respective half-skew stream.

Figure 8:
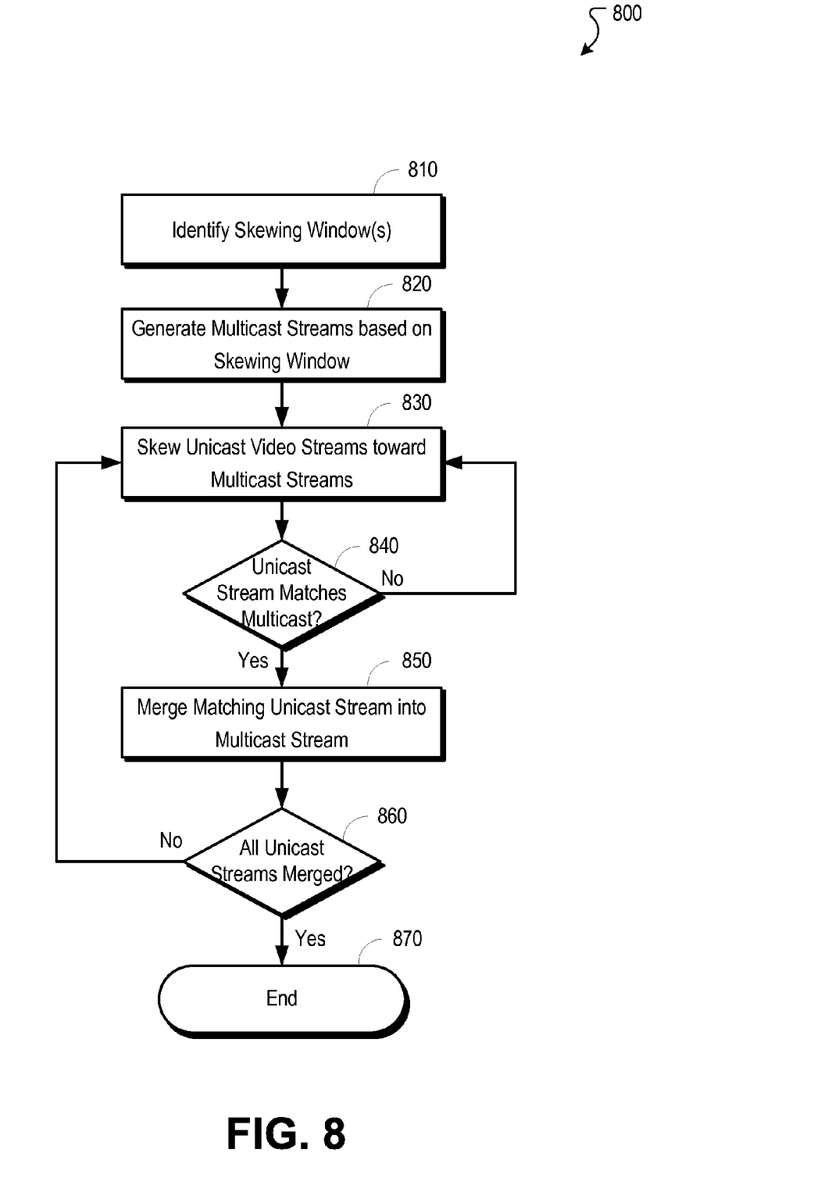
FIG. 8 is a flowchart illustrating an example process to skew and consolidate unicast video streams into fewer multicast video streams.

FIG. 8 is a flowchart showing an example process 800 for skewing multiple unicast video streams into a multicast video stream. The process 800 begins at stage 810 where the skewing windows are identified. The skewing windows can be identified, for example, by a video server (e.g., VoD server 145, streaming media source 180, or source 150). In other examples, the skewing windows can be identified, for example, by a video pump component. In some implementations, the skewing window can be identified by doubling a maximum skewing rate, and multiplying the result by the duration of the unicast program.

At stage 820, multicast streams can be generated based on the skewing window. The multicast streams can be generated, for example, by the video server (e.g., VoD server 145, streaming media source 180, or source 150). In other examples, the multicast streams can be generated by a multicast server. In various implementations, the number of multicast streams generated can be modified based upon design considerations. As described above, a multicast for each skewing window can result in the highest overall efficiency, but is slow to achieve the savings. A multicast for each half-skewing window results in lower savings but achieves efficiencies more quickly, since unicast videos require less skewing to merge into the half-skew multicast streams. Moreover, in a hybrid approach, the half-skewing multicast streams can be supplemented by quarter-skew multicasts into which the unicast streams are merged, and which themselves are gradually merged into the half-skew multicast streams. It should be understood that there are numerous modifications that can be made to the approach described herein without departing from the scope of the present disclosure.

At stage 830, the unicast streams are skewed into the multicast streams. The unicast streams can be skewed into the multicast streams, for example, by a video server (e.g., VoD server 145, streaming media source 180, or source 150), or by a video pump operating in conjunction with the video server. In some implementations, the video server or video pump can skew the video stream by playing out the content at an accelerated or reduced rate. The accelerated or reduced rate can be based upon a rate that is imperceptible to the viewer. Alternatively, the accelerated or reduced rate may be perceptible to the viewer, but does not materially alter the viewer's enjoyment of the program.

At stage 840, a determination is made whether any unicast streams match any multicast stream. The determination can be made, for example, by a video server (e.g., VoD server 145, streaming media source 180, or source 150) or by a multicast server operating in conjunction with the video server. If a unicast stream matches a multicast stream, the matching unicast stream can be merged into the multicast stream at stage 850. The unicast stream can be merged into the multicast stream, for example, by a video server (e.g., VoD server 145, streaming media source 180, or source 150) or a multicast server operating in conjunction with the video server. However, if no unicast streams match any multicast streams, the process returns to stage 830 and continues to skew the unicast streams towards their respective multicast stream.

Returning to stage 850, after merging the streams, the process 800 can determine whether all unicast streams have been merged at stage 860. The determination of whether all unicast streams have been merged can be made, for example, by a video server (e.g., VoD server 145, streaming media source 180, or source 150). If there are unicast streams that have not been merged, the process 800 can return to stage 830, where the unicast streams continue to be skewed towards their respective multicast stream. However, if all unicast stream have been merged into multicast streams, the process 800 ends at stage 870.

Figure 9:
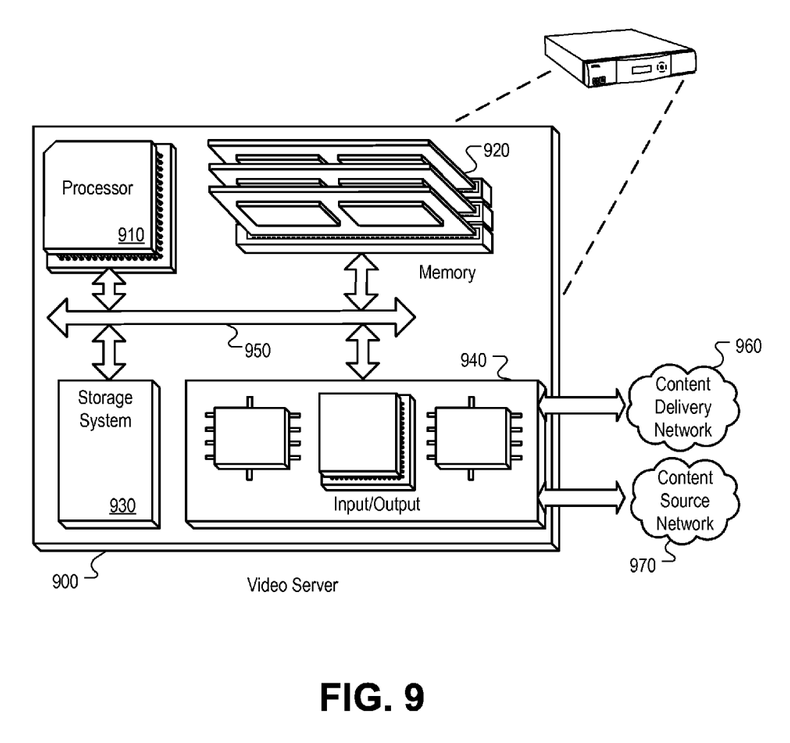
FIG. 9 is a block diagram of an example video server operable to skew and consolidate unicast video streams into multicast video streams.

FIG. 9 is a component diagram of an example video server system 900 operable to skew multiple unicast streams into one or more multicast streams. The video server system 900 can include a processor 910, a memory 920, a storage device 930, and an input/output device 940. Each of the components 910, 920, 930, and 940 can be interconnected, for example, using a system bus 950. The processor 910 is capable of processing instructions for execution within the video server system 900. In one implementation, the processor 910 is a single-threaded processor. In another implementation, the processor 910 is a multi-threaded processor. The processor 910 is capable of processing instructions stored in the memory 920 or on the storage device 930.

The memory 920 stores information within the video server system 900. In one implementation, the memory 920 is a computer-readable medium. In one implementation, the memory 920 is a volatile memory unit. In another implementation, the memory 920 is a non-volatile memory unit.

In some implementations, the storage device 930 is capable of providing mass storage for the video server system 900. In one implementation, the storage device 930 is a computer-readable medium. In various different implementations, the storage device 930 can include, for example, a hard disk device, an optical disk device, flash memory or some other large capacity storage device.

The input/output device 940 provides input/output operations for the video server system 900. In one implementation, the input/output device 940 can interface to a content delivery network 960 or a content source network 970. In addition, such input/output device 940 can communicate with other external devices through various interfaces such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices (e.g., a content delivery network 960 and/or content source network 970), as well as sending communications to, and receiving communications from various networks (not shown).

Various systems and methods of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising: identifying a skewing window associated with a plurality of unicast video streams based upon a skewing rate and a program duration associated with the unicast video streams, the plurality of unicast video streams being associated with the same piece of video content; generating one or more multicast streams based upon the skewing window; skewing the plurality of unicast video streams toward a respective one of the one or more multicast streams, thereby producing a plurality of skewed unicast video streams; merging the plurality of skewed unicast video streams into the respective one or more multicast video streams; determining whether a skewed unicast video stream from the plurality of skewed unicast video streams matches one of the one or more multicast video streams; wherein merging comprises merging the matching skewed unicast video stream into a matching multicast video stream; determining whether any skewed unicast video stream has not been merged with the one or more multicast video streams; responsive to the determination, continuing to skew the non-matching unicast video stream until all skewed unicast video streams from the plurality of skewed unicast video streams have been merged into the one or more multicast video streams.

2. The computer-implemented method of claim 1, wherein the skewing window comprises a product of the maximum skewing rate multiplied by two and the program duration.

3. The computer-implemented method of claim 2, wherein the maximum skewing rate is defined by a maximum skewing of the video program that is imperceptible to a viewer.

4. The computer-implemented method of claim 2, wherein the maximum skewing rate is defined by a maximum skewing of the video program that is acceptable to a viewer.

5. The computer-implemented method of claim 1, wherein a number of multicast video streams comprises a number of skewing windows that fit within the program duration of the video content, evenly spaced throughout the duration of the video program.

6. The computer-implemented method of claim 1, wherein a number of multicast video streams comprises a number of half-skewing multicast streams that fit within the program duration of the video content, evenly spaced throughout the duration of the video program.

7. The computer-implemented method of claim 1, wherein a number of multicast video streams comprises a number of quarter-skewing multicast streams that fit within the program duration of the video content evenly spaced throughout the duration of the video program.

8. The computer-implemented method of claim 7, wherein the number of multicast video streams further comprises a number of half-skewing multicast streams evenly spaced throughout the program, the quarter-skewing multicast streams being skewed and merged into a respective one of the half-skewing multicast streams.

9. A video server, comprising: a merging module operable to identify a skewing window associated with a plurality of unicast video streams based upon a skewing rate and a program duration associated with the unicast video streams, the plurality of unicast video streams being associated with the same piece of video content; a multicast streaming module operable to generate one or more multicast streams based upon the skewing window identified by the merging module; a skewing module operable to skew the plurality of unicast video streams toward a respective one of the one or more multicast streams, thereby producing a plurality of skewed unicast video streams; the merging module being further operable to merge the plurality of skewed unicast video streams into the respective one or more multicast video streams the merging module is further operable to determine whether a skewed unicast video stream from the plurality of skewed unicast video streams matches one of the one or more multicast video streams, and to merge the matching skewed unicast video stream into a matching multicast video stream; the merging module is operable to determine whether any skewed unicast video stream has not been merged with the one or more multicast video streams and to instruct the skewing module responsive to the determination, until all skewed unicast video streams from the plurality of skewed unicast video streams have been merged into the one or more multicast video streams.

10. The video server of claim 9, wherein the skewing window comprises a product of the maximum skewing rate multiplied by two and the program duration.

11. The video server of claim 9, wherein a number of multicast video streams comprises a number of skewing windows that fit within the program duration of the video content, evenly spaced throughout the duration of the video program.

12. The video server of claim 9, wherein a number of multicast video streams comprises a number of half-skewing multicast streams that fit within the program duration of the video content, evenly spaced throughout the duration of the video program.

13. The video server of claim 9, wherein a number of multicast video streams comprises a number of quarter-skewing multicast streams that fit within the program duration of the video content evenly spaced throughout the duration of the video program.

14. The video server of claim 13, wherein the number of multicast video streams further comprises a number of half-skewing multicast streams evenly spaced throughout the program, the quarter-skewing multicast streams being skewed and merged into a respective one of the half-skewing multicast streams.

15. One or more computer-readable media operable to be executed by one or more computer processors, the computer-readable media, upon execution by the one or more computer processors being operable to cause the one or more computer processors to: identify a skewing window associated with a plurality of unicast video streams for a single content item based upon a skewing rate and a program duration associated with the single content item; generate one or more multicast streams based upon the skewing window; skew the plurality of unicast video streams toward a respective one of the one or more multicast streams, thereby producing a plurality of skewed unicast video streams; merge the plurality of skewed unicast video streams into the respective one or more multicast video streams; determining whether a skewed unicast video stream from the plurality of skewed unicast video streams matches one of the one or more multicast video streams; wherein merging comprises merging the matching skewed unicast video stream into a matching multicast video stream; determining whether any skewed unicast video stream has not been merged with the one or more multicast video streams; responsive to the determination, continuing to skew the non-matching unicast video stream until all skewed unicast video streams from the plurality of skewed unicast video streams have been merged into the one or more multicast video streams.

* * * * *